(12) United States Patent
Mazet et al.

(10) Patent No.: US 8,040,969 B2
(45) Date of Patent: Oct. 18, 2011

(54) COMMUNICATION SYSTEM AND METHOD OF OPERATION THEREFOR (75) Inventors: Laurent S. Mazet, Paris (FR); Patrick Labbe, Antony (FR); Anahid Robert, Ivry-sur-Seine (FR)

(73) Assignee: Motorola Mobility, Inc., Libertyville, IL (US)

( * ) Notice: Subject to any disclaimer, the term of this patent is extended or adjusted under 35 U.S.C. 154(b) by 569 days.

(21) Appl. No.: 12/246,615

(22) Filed: Oct. 7, 2008

(65) Prior Publication Data
US 2010/0086072 A1    Apr. 8, 2010

(51) Int. Cl.
    *H04B 7/02* (2006.01)
(52) U.S. Cl. ..................................... 375/267
(58) Field of Classification Search .......... 375/267, 375/285, 316, 340, 346–350; 370/329, 334, 370/342; 455/500, 101, 272
See application file for complete search history.

(56) References Cited

U.S. PATENT DOCUMENTS

| | | | |
|---|---|---|---|
| 7,062,295 B2 | 6/2006 | Yoshii et al. | |
| 7,184,743 B2 | 2/2007 | Walton et al. | |
| 7,406,337 B2 * | 7/2008 | Kim et al. | 455/562.1 |
| 7,813,262 B1 | 10/2010 | Rao | |
| 7,953,176 B2 * | 5/2011 | Roh | 375/295 |
| 2003/0086479 A1 | 5/2003 | Naguib | |
| 2005/0185730 A1 | 8/2005 | Hansen et al. | |
| 2005/0265470 A1 * | 12/2005 | Kishigami et al. | 375/267 |
| 2007/0155336 A1 * | 7/2007 | Nam et al. | 455/69 |
| 2008/0081565 A1 | 4/2008 | Kim | |
| 2008/0159425 A1 * | 7/2008 | Khojastepour et al. | 375/260 |
| 2008/0165875 A1 * | 7/2008 | Mundarath et al. | 375/262 |
| 2009/0316802 A1 * | 12/2009 | Tong et al. | 375/260 |

OTHER PUBLICATIONS

Yoshitaka Hara, et al., "Uplink Spatial Scheduling With Adaptive Transmit Beamforming in Multiuser MIMO Systems," Proceedings of The 17th Annual IEEE International Symposium on Personal, Indoor and Mobile Radio Communications (PIMRC'06), Sep. 2006, pp. 1-5.

Xi and Zoltowski, "Uplink Multiuser MIMO Transceiver Design With Transmitting Beamforming Under Power Constraints," IEEE Military communications Conference, 2006 (MILCOM 2006) Oct. 23-25, 2006, pp. 1-7.

Beheshti M. et al.: "Minimum Variance Linear Receivers for Multiaccess MIMO Wireless Systems with Space-Time Block Coding", IEEE Transactions on Signal Processing, IEEE Service Center, New York, NY, US vol. 52, No. 12, Dec. 1, 2004, pp. 3306-3313.

(Continued)

*Primary Examiner* — Khanh C Tran (57) ABSTRACT

A Multiple In Multiple Out (MIMO) communication system comprises an air interface scheduler for allocating air interface resource to a plurality of user equipments transmitting to a MIMO receiver. A vector processor of the scheduler determines a receive equalizer vector for the MIMO receiver for each of a plurality of user equipments in response to a channel matrix for the user equipment. The vector processor may specifically apply singular value decomposition to the channel matrix to determine the receive equalizer vector. An orthogonality processor then determines orthogonality measures between receive equalizer vectors for different sets of user equipments. A selection processor selects a set of user equipments to be allocated a shared MIMO air interface resource in response to the orthogonality measures. By scheduling in response to orthogonality of receiver operations, a reduced interference and/or reduced receiver complexity can be achieved.

15 Claims, 3 Drawing Sheets

OTHER PUBLICATIONS

Al-Dhahir N. et al.: "Algebraic properties of space-time block codes in intersymbol interference multiple-access channels", IEEE Transactions on Information Theory, IEEE, US vol. 49, No. 10, Oct. 1, 2003, pp. 2403-2414.

Jeong J H et al.: "An iterative receiver for layered space-time MIMO DS-CDMA uplink using turbo trellis-coded modulation", Wireless Communications and Networking Conference, 2005 1III New Orleans, LA, USA Mar. 13-17, 2005, Piscataway, NJ, USA, IEEE, vol. 1, Mar. 13, 2005, pp. 320-325.

Jane W Huang et al: "Precoding of Space-Time Block Codes in Multiuser MIMO Channels with Outdated Channel State Information", Information Theory, 2007, ISIT 2007, IEEE International Symposium on, IEEE, Piscataway, NJ, USA, Jun. 24, 2007, pp. 2031-2035.

Gozali, Ran et al: The Impact of Multiuser Diversity on Space-Time Block Coding, IEEE Communications Letters, vol. 7, No. 5, May 2003, pp. 213-215.

Larsson, Erik G.: On the Combination of Spatial Diversity and Multiuser Diversity, IEEE Communications Letters, vol. 8, No. 8, Aug. 2004, pp. 517-519.

Sun, Chen et al.: Combining Beamforming with Alamouti Scheme for Multiuser MIMO Communications, In Proceedings of the IEEE Vehicular Technology Conference, Fall, vol. 2, Los Angeles, USA, Sep. 2004, pp. 1415-1419.

Vicario, Jose Lopez et al.: Joint exploitation of spatial and multi-user diversity via space-time block-coding and antenna selection,In Proc. IEEE International Conference on Communications, 2005, vol. 5, 0-7803-8938-7105, pp. 2911-2915.

\* cited by examiner

COMMUNICATION SYSTEM AND METHOD OF OPERATION THEREFOR

RELATED APPLICATIONS

The present application is related to the following U.S. application commonly owned with this application by Motorola, Inc.: Ser. No. 12/107,353, filed Apr. 22, 2008, titled "A Communication System and Method of Operation Therefor".

FIELD OF THE INVENTION

The invention relates to a Multiple In Multiple Out (MIMO) communication system and a method of operation therefor.

BACKGROUND OF THE INVENTION

In recent years, the popularity of systems using wireless radio communication has increased substantially. For example, cellular communication systems and wireless networks have now become commonplace. The increased requirement for frequency spectrum resource has led to an increased desire for efficient communication and especially at higher frequencies and for higher data rates.

For example, Broadband Wireless Access systems (BWA) are becoming common not only in fixed deployments but also in mobile deployments. In order to increase the capacity of such BWAs, it is desirable to increase the data rate of the wireless communication. As a specific example, the Institute of Electrical and Electronic Engineers (IEEE) have formed a committee for standardizing an advanced air interface for operation in licensed bands known as IEEE 802.16m. (Trademark). The 802.16m™ standard comprises BWA Medium Access Control (MAC) and Physical Layer (PHY) specifications aimed at enhancing BWAs to meet the cellular layer requirements of International Telecommunications Union Radiocommunications Sector (IMT-Advanced) next generation mobile networks. Similarly, Wireless Local Area Network WLANs are becoming common not only in business environments but also in domestic environments. The IEEE has formed a committee for standardizing a very high-speed WLAN standard known as IEEE 802.11vht. It is intended that the 802.11vht™ standard will help WLANs meet the expanding bandwidth needs of enterprise and home networks, as well as those of WLAN hot spots. Other popular examples of wireless networks include the more popular names of WiFi™ and WiMAX™ (corresponding to IEEE 802.11n and IEEE 802.16e)

In order to achieve high data rates over the air interface, a number of advanced radio techniques are employed. It has been found that in systems using open-loop approaches (i.e. without the transmitter using knowledge of the transmit channel or the signal received at the receiver) significant improvement can be achieved by using multiple antennas at the transmitter and the receiver. In particular, many radio communication systems, such as WLANs, provide for a plurality of transmit and receive antennas to be used. Specifically, some transmission techniques involve transmitting a data stream by simultaneously transmitting different signals derived from the data stream from different antennas over the same communication channel. The receiver(s) of these techniques typically also comprise a plurality of antennas each of which receive a combined signal corresponding to the transmitted signals modified by the individual propagation characteristics of the radio link between the individual antennas. The receiver may then retrieve the transmitted data stream by evaluating the received combined signal.

Such techniques may also be used in closed loop configurations wherein the receiver may communicate information back to the transmitter allowing this to weight the signals to the individual antennas. Specifically, data may be fed back to the transmitter to allow this to provide a suitable beamforming. Such open and closed loop techniques are known as Multiple Transmit Multiple Receive (MTMR) or Multiple Input Multiple Output (MIMO) schemes and can be designed to derive benefit from spatial diversity between the antennas in order to improve detection. Indeed, the equivalent Signal to Noise Ratio (SNR) of the combined signal is typically increased compared to the single antenna case thereby allowing higher channel symbol rates or higher order constellations. This may increase the data rate for the communication link and thus the capacity of the communication system.

In order to further enhance the capacity of MIMO systems, it has been proposed that multiple users may share the same air interface resource, and specifically that two users may be allocated the same time-frequency block. For example, two user equipments may be allowed to simultaneously transmit uplink signals to a base station using the same frequency channel.

In such systems, the scheduling of user equipments (i.e. the assignment of time-frequency resources to user equipments) is critical for the performance of the system, and in particular it is of the utmost importance that the most suitable user equipments are scheduled to share the same time-frequency resource block.

In known systems, such scheduling may be based on the overall channel conditions or the transmit beamforming of the transmitting MIMO user equipments (the weights applied to each MIMO antenna of the transmitting MIMO user equipment). Specifically, typical scheduling algorithms seek to allocate user equipments to share time-frequency resource blocks such that the sharing user equipments have the most different overall channel conditions or transmit beamforming characteristics.

However, although such scheduling may provide acceptable performance in many scenarios, it also tends to be suboptimal and have a number of disadvantages. For example, in many scenarios it may result in complex processing e.g. in order to determine the overall channel responses and to evaluate which user equipments have overall channel responses that are most suitable for sharing resource blocks. Furthermore, in order to provide the desired performance and differentiation between the user equipments sharing the same time-frequency resource block, complex equalization is typically necessary by the individual receivers. For example, as the scheduling is based on transmitter or overall channel conditions, the receiver equalization will typically need to utilize complex non-linear equalization in order to reduce the cross-interference between the sharing user equipments sufficiently.

Such non-linear equalization may for example include an iterative equalization wherein received data symbols are estimated in each iteration, with the estimated data symbols of one user equipment of a previous iteration being used to estimate the data symbols of the other user equipment in the following iteration. This equalization process will typically have to be iterated a number of times resulting in high computational requirements. Hence, an improved communication system would be advantageous and in particular a system allowing increased flexibility, facilitated implementation, reduced complexity, reduced resource usage, increased spectral efficiency, improved and/or facilitated multi-user operation and/or improved performance would be advantageous.

SUMMARY OF THE INVENTION

Accordingly, the Invention seeks to preferably mitigate, alleviate or eliminate one or more of the above mentioned disadvantages singly or in any combination. According to a first aspect of the invention there is provided a Multiple In Multiple Out, MIMO, communication system comprising: a vector processor for determining a receive equalizer vector for a MIMO receiver for each of a plurality of user equipments in response to a channel matrix for the user equipment; an orthogonality processor for determining, for a plurality of sets of user equipments, orthogonality measures between receive equalizer vectors of user equipments in the set, each set comprising at least two user equipments of the plurality of user equipments; a selection processor for selecting at least a first set of user equipments from the plurality of sets of user equipments to be allocated a shared MIMO air interface resource in response to the orthogonality measures; and an allocation processor for allocating the shared MIMO air interface resource to the first set of user equipments for simultaneous MIMO communication.

The invention may allow improved performance in a MIMO communication system. In particular, it may in many scenarios enable, facilitate or improve multiple user equipments reusing/sharing the same frequency resource at the same time thereby providing an increased capacity of the communication system as a whole. The scheduling of users is performed in response to a receive equalizer vector thereby allowing the scheduling to reflect the operation of the receiver. For example, the receive equalizer vector may represent a processing that can be performed by the MIMO receiver receiving the signals from the first set of user equipments. Thus, the scheduling may specifically seek to select user equipments that share the MIMO air interface resource such that these are suitable for the receive processing represented by the receive equalizer vector. Specifically, they may be selected such that user equipments sharing the air interface resource require high degrees of orthogonal receiver equalization and thus such that the receiver equalization may effectively differentiate between the received signals from the individual user equipments.

The receive equalizer vector may specifically represent a simple linear receiver equalization. Thus, user equipments may be selected to share air interface resource such that sharing user equipments can be effectively received using linear equalization which has high levels of orthogonality. Thus, by selecting sharing user equipments to be suitable for low complexity linear equalization, the MIMO receiver need not apply complex non-linear equalization. Accordingly, the computational requirement for the MIMO receiver may be reduced substantially.

The vector processor may specifically determine a receive equalizer vector for a user equipment such that it represents the (e.g. theoretical or ideal) equalizer operation corresponding to receiving the MIMO signal from that user equipment with the highest reliability (e.g. the operation that minimizes a signal to noise/interference measure).

The receive equalizer vector may specifically represent the weights being applied to each receive antenna by a linear equalizer. The linear equalizer may combine the weighted signals from each antenna, e.g. by a simple summation.

The vector processor may e.g. determine the receive equalizer vector by a singular value decomposition of the channel matrix. According to a different aspect of the invention, there is provided a scheduler for a Multiple In Multiple Out, MIMO, communication system, the scheduler comprising: a vector processor for determining a receive equalizer vector for a MIMO receiver for each of a plurality of user equipments in response to a channel matrix for the user equipment; an orthogonality processor for determining, for a plurality of sets of user equipments, orthogonality measures between receive equalizer vectors of user equipments in the set, each set comprising at least two user equipments of the plurality of user equipments; a selection processor for selecting at least a first set of user equipments from the plurality of sets of user equipments to be allocated a shared MIMO air interface resource in response to the orthogonality measures; and an allocation processor for allocating the shared MIMO air interface resource to the first set of user equipments for simultaneous MIMO communication.

According to a different aspect of the invention, there is provided a method of operation for a Multiple In Multiple Out, MIMO, communication system, the method comprising: determining a receive equalizer vector for a MIMO receiver for each of a plurality of user equipments in response to a channel matrix for the user equipment; determining, for a plurality of sets of user equipments, orthogonality measures between receive equalizer vectors of user equipments in the set, each set comprising at least two user equipments of the plurality of user equipments; selecting at least a first set of user equipments from the plurality of sets of user equipments to be allocated a shared MIMO air interface resource in response to the orthogonality measures; and allocating the shared MIMO air interface resource to the first set of user equipments for simultaneous MIMO communication.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a Broadband Wireless Access system (BWA) and in particular to an IEEE 802.16e™ communication system but is also applicable to e.g. a WLAN communication system and in particular to an IEEE 802.11vht™ WLAN. However, it will be appreciated that the invention is not limited to such applications but may be applied to many other communication systems including for example cellular communication systems.

Figure 1:
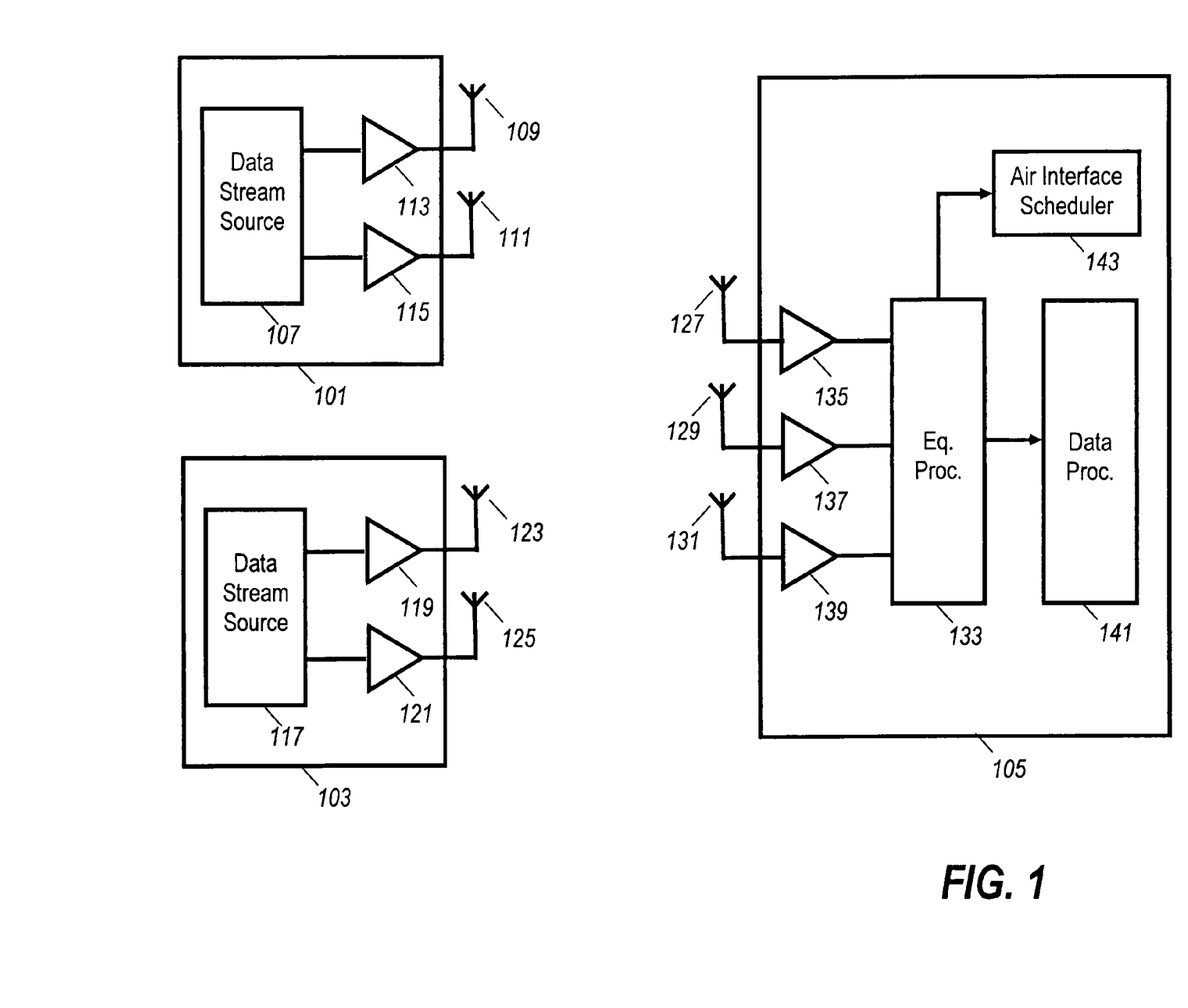
FIG. 1 illustrates examples of elements of a MIMO communication system in accordance with some embodiments of the invention.

FIG. 1 illustrates examples of elements of a MIMO communication system in accordance with some embodiments of the invention. In the system, the air interface resource of BWA base stations are divided into time slots and thus air interface may be allocated in time-frequency blocks corresponding to one frequency channel in one time slot. Within each time-frequency block, a plurality of user equipments is allocated to simultaneously transmit to the base station. Furthermore, the user equipments simultaneously allocated in a time slot transmit using MIMO techniques and thus the data is transmitted from a plurality of antennas and are in the example received by a plurality of antennas. The base stations use MIMO receiver techniques to decode the data streams of the individual user equipments sharing the time-frequency blocks and specifically use receiver equalization techniques to differentiate the signals from the individual user equipments.

FIG. 1 illustrates an example of elements of the communication system. FIG. 1 specifically illustrates a first and second user equipment 101, 103 which are currently seeking to transmit uplink data to a base station 105 (which in the specific example is a BWA 802.16e™ base station). In the example, the user equipments 101, 103 represent a typically substantially larger number of user equipments that are seeking to obtain uplink resource.

In the example, the user equipments 101, 103 are BWA devices operating in accordance with the 802.16e™ or 802.11vht™ communication standards but it will be appreciated that in other embodiments the user equipments may be e.g. a mobile phone, a remote station, a 3G User Equipment or indeed any entity capable of communicating over an air interface of a MIMO communication system. In the example, the base station is a BWA base station communicating in accordance with the 802.16e™ or 802.11vht™ communication standards but it will be appreciated that in other embodiments the base station may be e.g. a cellular base station or any entity capable of supporting a plurality of user equipments over the air interface of a MIMO communication system.

The first user equipment 101 comprises a data stream source 107 which generates a data stream comprising uplink data symbols that are to be transmitted to the base station 105 over the air interface. The data stream is in the example transmitted using a MIMO technique and in the specific example, the first user equipment 101 uses two transmit antennas 109, 111 which are coupled to the data stream source 107 via separate transceivers 113, 115 comprising up-converters, amplifiers etc as will be known to the person skilled in the art.

The second user equipment 103 is in the specific example identical to the first user equipment 101 and accordingly also comprises a data stream source 117, two amplifiers 119, 121 and two transmit antennas 123, 125. In the example, the base station 105 supports uplink communications from a number of other user equipments (not shown) that are similar or identical to the first and second user equipments 101, 103 and which specifically also use MIMO transmission techniques for uplink transmissions.

It will be appreciated that more than two antennas may be used by each user equipment and indeed that the number of antennas may in some embodiments be different for different user equipments.

In the example of FIG. 1 a plurality of user equipments 101, 103 may simultaneously transmit MIMO transmissions to the base station 105 over the air interface. The parallel transmissions from the multiple antennas 109, 111, 123, 125 of each user equipment 101, 103 are received by the base station 105. Specifically, in the example, the base station 105 comprises three antennas 127, 129, 131 that are coupled to an equalization processor 133 via individual receive amplifiers 135, 137, 139. The equalization processor 133 applies receive MIMO equalization techniques to receive the individual data symbols transmitted from the individual user equipments 101, 103 sharing the time-frequency resource block. The received data is fed to a data processor 141 which processes the received channel symbols by for example applying error correction etc.

In a typical communication system, a relatively large number of user equipments are supported by each base station. In the communication system of FIG. 1, the base station 105 supports a number N of user equipments by dividing an air interface communication channel (carrier) into a number of sequential scheduling time slots or intervals. Each of the air interface communication channels may e.g. correspond to a set of OFDM (Orthogonal Frequency Division Multiplexing) subcarriers. Thus, the system uses time division multiplexing to accommodate the N users in a number of time-frequency resource blocks.

Furthermore, in the system of FIG. 1 a set comprising a plurality of user equipments is allocated for simultaneous transmission in each time-frequency resource block. The following description will focus on examples wherein a set of two user equipments is allocated to share each time-frequency resource block but it will be appreciated that in other embodiments, other numbers of user equipments may share the time-frequency resource blocks.

The performance of the individual communications and the resulting capacity of the communication system as a whole are highly dependent on which user equipments are scheduled together in each time-frequency resource block. Specifically, as the two user equipments will introduce interference to each other, it is important to minimize this interference as much as possible.

In the system of FIG. 1, the uplink scheduling for the cell served by the base station 105 is performed by the base station 105 itself. Hence, the base station 105 comprises an air interface scheduler 143 for selecting user equipments for each scheduling resource block from the N user equipments requesting uplink resource. It will be appreciated that although the following description focuses on an example wherein the scheduler 143 is located in the base station 105, it may in other embodiments be located elsewhere, such as in an interconnecting network, or may e.g. be distributed over a plurality of logical or physical locations and entities.

The scheduler 143 selects the user equipments for a given scheduling time slot in response to orthogonality measures that indicate the orthogonality between receive equalizer vectors that reflect a linear receiver equalization. The scheduler 143 specifically selects user equipments to share resource blocks such that the individual signals from the user equipments can be effectively resolved and differentiated by applying linear receive equalizer vectors to the received signals. Thus, the user equipments are selected such that user equipments sharing a given time-frequency resource block may require substantially orthogonal linear receive equalization, and thus such that the equalizer vector required to maximize the received signal from one user equipment will automatically (due to the high degree of orthogonality) result in a high attenuation of the received signal from the other user equipment transmitting in the shared time-frequency resource block.

Furthermore, by focusing on the orthogonality of the receiver equalization rather than the orthogonality of e.g. the transmitter beamforming, the overall channel response or the propagation channel characteristics, a relatively low complexity operation can be achieved wherein only a relatively low number of calculations need to be performed for each user equipment.

Also, as the scheduling is optimized to specifically provide a high degree of orthogonality of a linear receiver equalization, it can be assured that suitable performance can be achieved by receivers actually using such linear equalization. Thus, the receiver based scheduling approach may substantially reduce the requirements for the receiver operation and may specifically allow a linear equalization to be performed by the equalization processor 133. Thus, a substantial complexity reduction can be achieved for the receiver functionality in comparison to the complex non-linear equalization typically required for conventional scheduling approaches.

Figure 2:
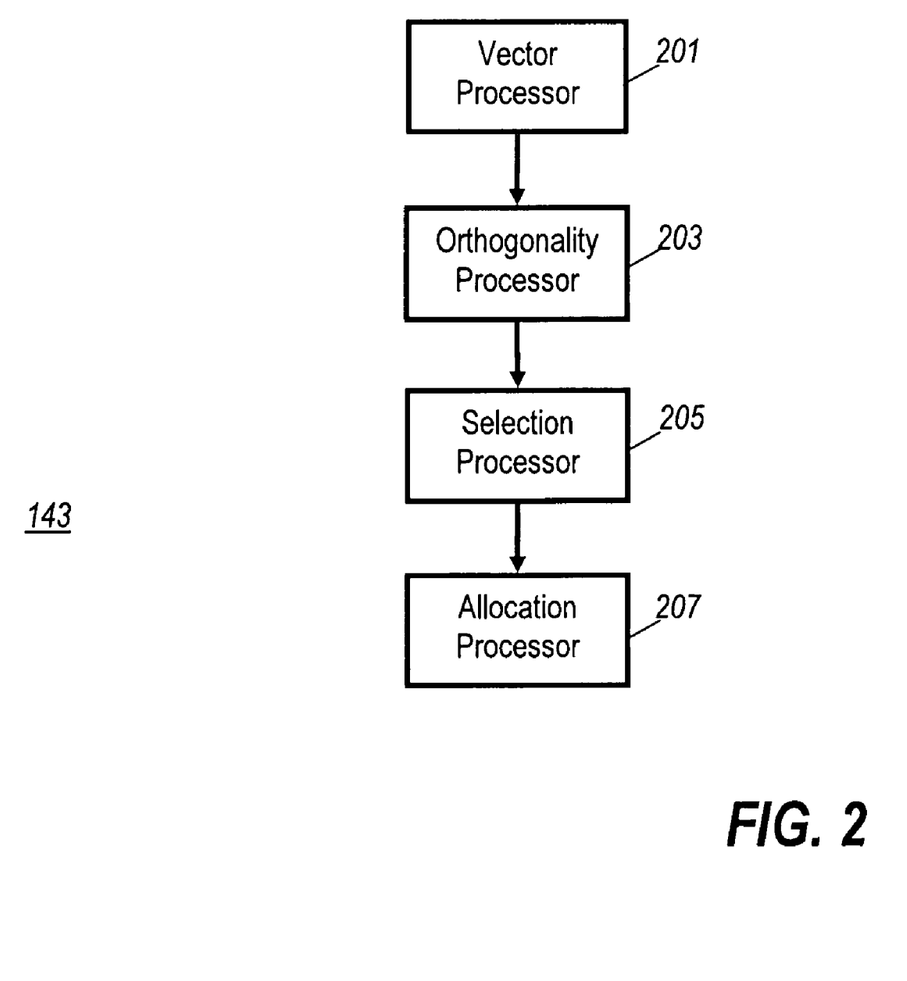
FIG. 2 illustrates examples of elements of a scheduler for a MIMO communication system in accordance with some embodiments of the invention.

FIG. 2 illustrates some elements of the scheduler 143. The scheduler 143 comprises a vector processor 201 which is arranged to determine a receive equalizer vector for the equalization processor 133 for each user equipment of the N user equipments that are requesting uplink resource. The receive equalizer vector is determined in response to a channel estimate matrix for the user equipment.

For example, for the first user equipment 101, a channel matrix reflecting the propagation channel from each of the transmit antennas 109, 111 to each of the receive antennas 127, 129, 131 is determined. E.g. a frequency non-selective Rayleigh fading channel is assumed resulting in the matrix comprising a single complex value for each transmit antenna/receive antenna combination. The channel estimates may for example be based on known pilot signals in the transmissions from the individual user equipments and possibly antennas.

The channel (estimate) matrix is then evaluated to determine the linear processing that may be applied to the received signals to generate a receive signal from the first user equipment 101 having a suitable characteristic. Specifically, the receive equalizer vector may comprise the complex values which when multiplied with the received signal vector (i.e. the received signals from the three receive antennas 127, 129, 131) and combined (specifically summed) results in the contribution from each path being combined (summed) coherently. For example, if the applied transmit weights are known and the channel estimate matrix is known, the receive equalizer vector can be determined by solving the equations that result from the constraint that the result should add coherently.

In some embodiments, the transmit weights may not be known and the vector processor 201 may be arranged to also estimate these weights. In particular, for a given channel estimate matrix, the optimal transmit weights applied to the individual signals transmitted from each transmit antenna 109, 111 and the optimal receive weights applied to the signals received at each individual receive antenna 127, 129, 131 may be jointly determined. The receive equalizer vector may then be determined corresponding to the determined optimal receive weights. As described later, this determination may specifically be performed using a singular value decomposition approach.

The vector processor 201 is coupled to an orthogonality processor 203 which proceeds to determine orthogonality measures for sets of user equipments. The orthogonality measures are determined for the receive equalizer vectors of the user equipments in the set.

Thus, the orthogonality processor 203 is fed all the receive equalizer vectors for all N user equipments requesting uplink scheduling. It then proceeds to divide the N user equipments into a number of sets of user equipments with each set comprising the number of user equipments that may share a time-frequency resource block. Thus, in the specific example, the orthogonality processor proceeds to generate a number of pairs of user equipments. Specifically the orthogonality processor 203 can generate all possible combinations of sets comprising the desired number of user equipments. Thus, in the specific example, all possible pairings of the N user equipments are determined.

For each pair, an orthogonality between the two receive equalizer vectors is then determined. For example, the orthogonality may be determined in response to the inner product of the vectors. For embodiments comprising more than two user equipments in each set, the orthogonality measure may e.g. be determined by summing the calculated orthogonality measure for each possible pairing of user equipments in the set.

Thus, the orthogonality measure has an increasing value for a higher orthogonality between the receive equalizer vectors and thus indicates a higher orthogonality between the linear receiver operation reflected by the receive equalizer vectors. Thus, a higher orthogonality measure is indicative of a higher probability that the actual receiver equalization applied to the different user equipments in the set is more orthogonal, and thus will result in a higher differentiation between the signals from the different user equipments. Accordingly, a high orthogonality measure for a pair of user equipments is indicative of a highly orthogonal equalization being suitable for generating coherently added output signals from the two user equipments. As a consequence, the equalizer processing required to generate a coherently added signal for one user equipment will also result in a high attenuation of the signal from the other user equipment.

The orthogonality processor 203 is coupled to a selection processor 205 which is fed the determined orthogonality measures and which proceeds to select at least one set of user equipments in response to the orthogonality measures. The selection processor 205 may for example select the pair of user equipments which has the highest orthogonality measure. As this is indicative of a possibility of a high degree of differentiation being possible (even with a simple linear equalization), this set is highly suitable (or at least is the most suitable) for sharing a MIMO air interface resource, i.e. for being allocated the same shared time-frequency resource block.

The selection processor 205 is coupled to an allocation processor 207 which is fed an indication of the selected set(s) of user equipments. It then proceeds to allocate the MIMO air interface resource to these set(s). Specifically, a time-frequency resource block is allocated to each pair of user equipments selected by the selection processor 205. The allocation may be carried out in any suitable way, such as for example by broadcasting the resource allocation on a suitable broadcast channel.

Thus, in the described system, the allocation of shared air interface resource is adapted to provide a high degree of orthogonality of the receiver equalization (rather than e.g. of the overall channel performance or of the transmitter beamforming). This may result in attractive performance and in particular may allow a high degree of cross-interference reduction and differentiation even when using low complexity linear equalization.

In the specific example, the vector processor 201 is arranged to determine the receive equalizer vector for a given user equipment by performing a singular value decomposition of the channel matrix for the user equipments.

As will be well known to the skilled person, a singular value decomposition is a factorization of a matrix. For example, for an m-by-n matrix, M, whose components are either real numbers or complex numbers, a singular value decomposition may provide the factorization:

$$M = V\Sigma U^*$$

where U is an m-by-m unitary matrix, the matrix $\Sigma$ is m-by-n with nonnegative numbers on the diagonal (as defined for a rectangular matrix) and zeros off the diagonal, and V* denotes the conjugate transpose of V which is an n-by-n unitary matrix. This factorization is known as a singular-value decomposition of M.

It will be appreciated that different ways of implementing a singular value decomposition will be known to the skilled person and that any suitable approach may be used with detracting from the invention. In the specific case, the singular value decomposition is applied to the channel matrix. Accordingly, the generated matrices U and V represent a set of column vectors that when multiplied with the channel matrix (on the left and right side respectively) result in a matrix where only the main diagonal has positive values. Thus, the pair of column vectors of U and V corresponding to one value of the diagonal represents the vectors that when multiplied with the channel matrix provides the overall response equal to the value of the diagonal. Accordingly, if the column vector of U reflects the weighting of the transmitter antennas and the column vector of V represents the linear receiver equalization, the resulting overall operation of the transmitter weighting (beamforming), the channel response and the receiver equalization corresponds to the single complex value of the diagonal. Thus, the column vectors U and V are indicative of suitable coefficients for the transmitter beamforming and receiver equalization that will result in a coherent summation of signals being received at the output of the equalizer.

Thus, singular value decomposition provides a set of singular value decomposition values given by the values of the diagonal of the matrix $\Sigma$. For each of these values, there is a vector (of matrix U) that corresponds to the transmitter antenna weights and a vector (of matrix V) that corresponds to the receiver antenna weights. Thus, the singular value decomposition provided by the vector processor 201 may provide both the (theoretically ideal) transmitter antenna weights for the given channel matrix as well as the (theoretically ideal) receiver antenna weights for a linear equalization comprising an addition of weighted signals from the individual receive antennas.

Thus, in the example, the vector processor 201 may directly use one of the determined vectors of the matrix V as the receive equalizer vector since this directly indicates a suitable linear equalization operation.

Since the singular value decomposition provides more than one singular value (i.e. the diagonal of $\Sigma$ has more than one value), there are different possible transmit and receive weights that will result in suitable output signals from the linear equalizer. However, as each singular value of the diagonal represents the resulting signal being generated by the linear equalizer, the vector processor 201 may specifically select the singular value (and thus the corresponding transmitter and receiver antenna weights) that has the highest value.

In the following a more specific description using mathematical notation is provided wherein we define the transpose as $^T$ and the complex conjugate transpose as $^\dagger$. Capital bold face is used to indicate matrices, small boldface letters are used to indicate vectors and small letters are used to indicate complex or real scalars.

We consider the uplink of the multi-user system, where there are K simultaneous transmitters (user equipments) and a single receiver (base station). Each transmitter is equipped with $N_T$ antennas to perform beam forming and the receiver has $N_R$ antennas. The channel is assumed to be a frequency non-selective Rayleigh fading. The received signal vector at the receiver is then given by:

$$r = \sum_{i=1}^{K} \sqrt{P_i^{(s)}} H_i u_i s_i + n$$

where $s_i$ is the transmitted symbol from the $i^{th}$ transmitter with $E[|s_i|^2]=1$, $P_i^{(s)}$ denotes total transmit power of each user, $H_i$ is the $N_R \times N_T$ channel matrix from the $i^{th}$ transmitter to the receiver and n is the noise vector with $E[nn^\dagger]=P^{(n)}I$. $u_i$ denotes the $N_T \times 1$ vector of transmit beamforming, i.e. the weights applied to the individual antenna signal by the transmitter.

Additionally, $H_i$ can be written as:

$$H_i = V_i \Sigma_i U_i^\dagger$$

Thus, the channel matrix $H_i$ can be factorized using singular value decomposition to provide suitable antenna weights for the transmitter and a linear receiver. Thus, the receive equalizer vector can be selected as the column of $V_i$ that corresponds to the highest singular value of $\Sigma$. For a typical singular value decomposition algorithm the singular values will be sorted in descending order of the diagonal and thus the receive equalizer vector can be selected as the first column of $V_i$.

Thus, the singular value decomposition may be used by the scheduler 143 to provide suitable estimates for the appropriate transmit beamforming and receive linear equalization that should be performed for a given propagation channel between the user equipment 101, 103 and base station 105. The scheduling of the user equipments is then performed on the basis of these estimates and specifically such that the linear equalization for user equipments in the same time-frequency resource block is as orthogonal as possible. However, it will be appreciated that the actual transmitters and receivers need not necessarily apply these weights.

For example, although in some embodiments, the calculated transmitter weights may be communicated to the scheduled user equipments to use for the uplink transmission, the actual weights may be determined by other means. Similarly, the receiver need not necessarily use the linear equalization indicated by the receive equalizer vector but may use another receiving technique including e.g. a non-linear equalization.

Thus, the determined transmitter weights and receive equalizer vector may be considered a scheduling estimate for the actual applied signal processing. However, in many embodiments, the determined estimates may also be fed to the appropriate transmitter/receiver and thus may be the actual weights used. Thus, the equalizer processor 133 may also be fed the determined weights and use these to perform a linear equalization for the sharing user equipments.

As previously mentioned, the orthogonality processor 203 may determine the orthogonality measure for two user equipments by determining the inner product between the receive equalizer vectors of the user equipments. The inner product may then be used directly as the orthogonality measure for the pair of user equipments or may be processed further to determine the orthogonality measure.

As a specific example, the two receive equalizer vectors may be given as $v_1$ and $v_2$ where:

$$v_1 \begin{bmatrix} x_1 \\ y_1 + iz_1 \end{bmatrix} v_2 = \begin{bmatrix} x_2 \\ y_2 + iz_2 \end{bmatrix}$$

In the specific example, the vectors are the receive vectors determined from the appropriate (typically the first column of the matrix V of singular value decomposition of the appropriate channel matrices of the two user equipments. In this example, at least one component of each vector may be a scalar value whereas the other will be a complex value.

The inner product for $v_1$ and $v_2$ can then be calculated as:

$$< v_1 \cdot v_2 > = v_1 v_2^\dagger$$
$$= x_1 x_2 + y_1 y_2 - z_1 z_2 + i(z_1 y_2 - y_1 z_2)$$

This value may in some embodiments be used directly as an orthogonality measure.

In some embodiments, the orthogonality processor 203 may alternatively or additionally use a different approach to determine the orthogonality measure. Specifically, in this example the orthogonality processor 203 may first calculate an orthogonal vector to the receive equalizer vector of one of the user equipments of a set of user equipments. It may then proceed to determine a distance measure between this orthogonal vector and the receive equalizer vectors of other user equipments in the set. Thus, for a set comprising two user equipments, the orthogonal vector of one of the receive equalizer vectors is first found and then a distance between this and the other receive equalizer vector is calculated. It will be appreciated that any suitable distance measure may be used including specifically a distance measure that is easy to compute thereby allowing a reduced complexity. The distance measure may then be used to determine the orthogonality measure. For example, the reciprocal value may be used in order to provide an orthogonality measure that increases for increasing orthogonality.

Specifically, the orthogonal vector of a two component vector (thus corresponding to two receive antennas) can readily be determine. Specifically, the orthogonal vector to $v_1$ is given by:

$$v_1^\perp = \begin{bmatrix} -y_1 + iz_1 \\ x_1 \end{bmatrix}$$

Once the orthogonal vector $v_1^\perp$ is calculated, the distance between this vector and other vectors can be calculated e.g. as:

$$d(v_2, v_1^\perp) = \left\| \begin{bmatrix} x_2 + y_1 - iz_1 \\ y_2 + iz_2 - x_1 \end{bmatrix} \right\|^2$$
$$= \underbrace{x_1^2 + y_1^2 + z_1^2}_{=1} + \underbrace{x_2^2 + y_2^2 + z_2^2}_{=1} + 2(y_1 x_2 - x_1 y_2)$$

As the first two terms are constant and equal to unity for a singular value decomposition, the distance measure and thus the reciprocal (or e.g. sign inverted) orthogonality measure can simply be calculated as:

metric=$2(x_1 y_2 - x_2 y_1)$

This may thus result in a substantial reduction of the computational load. Specifically, it requires only two multiplications and one addition in comparison to the inner product approach which requires seven multiplications and four additions.

In some examples, the scheduler 143 may be arranged to allocate only a single time-frequency resource block at a time and this may e.g. be allocated to the user equipment pair that has the highest orthogonality measure. However, in most practical embodiments, the scheduler 143 is arranged to schedule a plurality of time-frequency resource blocks in each scheduling interval.

In such embodiments, the scheduler 143 may be arranged to select a plurality of sets (specifically pairs) of user equipments for the plurality of time-frequency resource blocks. For example, in each scheduling interval, the scheduler 143 may allocate M sets of user equipments to M time-frequency resource blocks.

In some such embodiments, the scheduler 143 may select the M sets by first generating a plurality of combinations of user equipments. For example, the scheduler 143 may generate all the possible combinations of M sets of user equipments that do not include any repetitions of an individual user equipment. Thus, these combinations may correspond to all feasible ways of allocating M sets of user equipments to the M time-frequency resource blocks without allocating any user equipment twice.

For each of the combinations, the scheduler may then calculate a combined orthogonality measure by combining the orthogonality measures of all sets included in the combination. For example, the orthogonality measures of the sets which are included in a combination may be added.

The scheduler 143 may then select a combination based on the combined orthogonality measures and may specifically select the combination that results in the highest combined orthogonality measure. The M time-frequency resource blocks may then be allocated to the M sets of user equipments included in this combination.

In other embodiments, the required computational resource may be substantially reduced by using an iterative and sequential approach. Specifically, the scheduler 143 may select a single set of user equipments as previously described. Specifically, the set of user equipments that has the highest orthogonality measure may be selected and a time-frequency resource block may be allocated to this set.

The selected set may then be removed from the pool of candidate sets. In addition, any other sets containing a user equipment of the allocated set may also be removed from the pool. The same process may then be iterated to select the next best set of user equipments from the reduced pool. The approach may then be repeated until all time-frequency resource blocks have been allocated. Thus, specifically the process may be repeated M times. Although, this approach may in some scenarios provide less optimal scheduling than considering all possible combinations, it may substantially reduce the required computational resource.

It will be appreciated that in different embodiments, different receiver equalizations may be applied by the equalization processor. Specifically, the equalization processor 133 may use a linear equalization wherein the equalization for each user equipment sharing the time-frequency resource block is given by applying the weights calculated by the singular value decomposition (and thus the weights of the receive equalizer vector).

For example, for user equipment k of a time-frequency resource block, the weights $v_k^\dagger$ may be used resulting in:

$$\hat{s}_k = v_k^\dagger r = \sqrt{P_k^{(s)}} \lambda_k s_k + v_k^\dagger \sum_{i \neq k} \sqrt{P_i^{(s)}} \lambda_i v_i s_i + v_k^\dagger n$$

As the scheduling algorithm seeks to make $v_k$ and $v_i$ as orthogonal as possible, the second term in the above equation will be minimized and may often be close to zero. Thus, in many systems the scheduling approach applied may make it feasible to use simple linear equalization for receiving signals from multiple user equipments sharing a given time-frequency resource block.

More specifically, it can be shown that the throughput can be determined as:

$$C = \log_2(1 + SINR)$$
$$= \log_2\left(1 + \frac{P_k^{(s)}\lambda_k^2}{P_i^{(s)}\lambda_i^2 P v_k^\dagger v_i P^2 + P^{(n)}}\right)$$

where $P v_k^\dagger v_i P^2$ will typically be a very low due to the allocation approach.

Thus, this approach provides the advantages of reduced complexity and computational resource demand while providing low interference.

It will be appreciated that the equalization processor 133 may use other approaches. For example, the equalization processor 133 may apply a Minimum Mean Squared Error (MMSE) equalizer as will be known to the person skilled in the art.

In such an example, the resulting output signal for user equipment k may be given by:

$$\hat{s}_k = g_k^\dagger r = \sqrt{P_k^{(s)}} \lambda_k g_k^\dagger v_k s_k + g_k^\dagger \sum_{i \neq k} \sqrt{P_i^{(s)}} \lambda_i v_i s_i + g_k^\dagger n$$

where $$g_k = \left(\lambda_i^2 v_k v_k^\dagger + \frac{P^{(n)}}{P_k^{(s)}} I\right)^{-1} \lambda_i v_i$$

As other examples, the equalization processor 133 may use Joint MMSE or Successive Interference Cancellation (SIC).

The use of the more complex receiver equalization may in some scenarios provide improved performance. However, as the scheduling may be based on an assumption of linear equalization, this improvement may be relatively limited. Furthermore, by basing the scheduling on a more simple linear equalization assumption, the computational resource demand may be reduced substantially.

Figure 3:
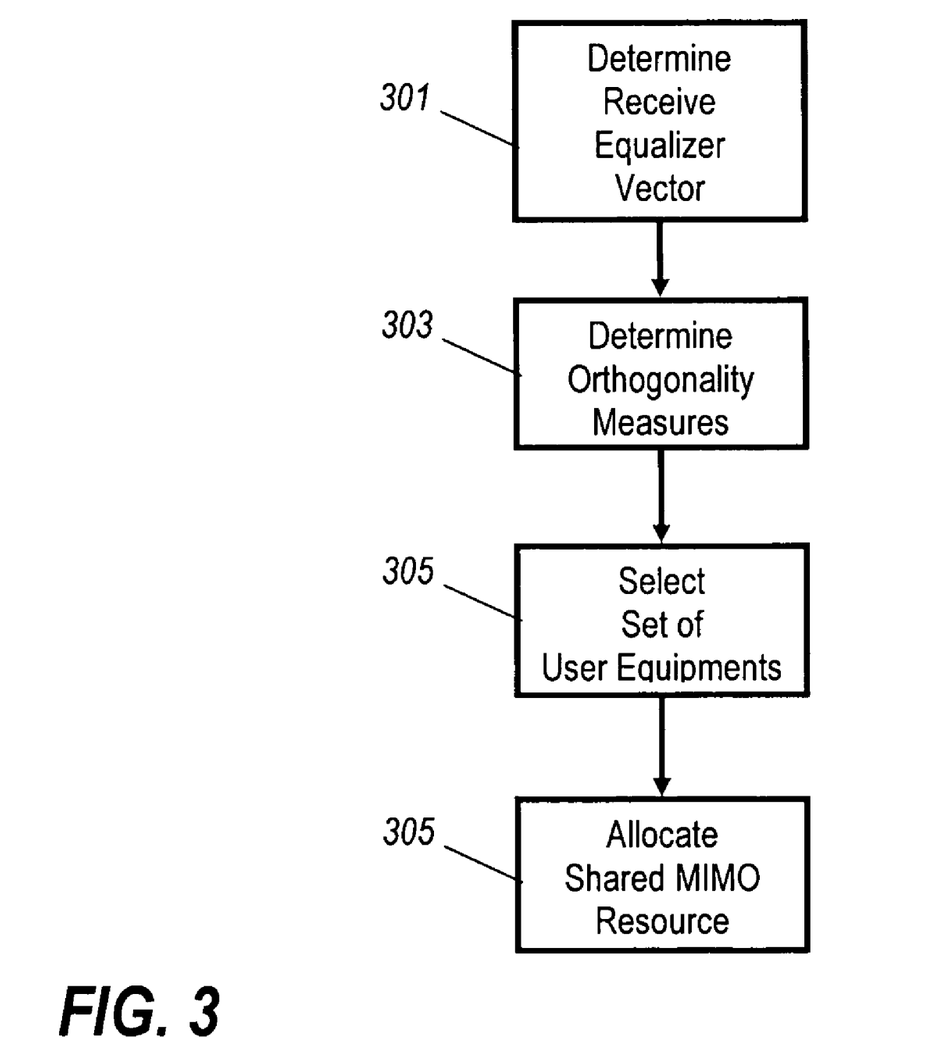
FIG. 3 illustrates an example of a method of operation for a MIMO communication system in accordance with some embodiments of the invention.

FIG. 3 illustrates an example of a method of operation for a MIMO communication system in accordance with some embodiments of the invention. The method initiates in step 301 wherein a receive equalizer vector is determined for a MIMO receiver for each of a plurality of user equipments in response to a channel matrix for the user equipment.

Step 301 is followed by step 303 wherein orthogonality measures between receive equalizer vectors of user equipments in a set of user equipments is determined for a plurality of sets of user equipments. Each set comprises at least two user equipments of the plurality of user equipments. Step 303 is followed by step 305 wherein at least a first set of user equipments is selected from the plurality of sets of user equipments to be allocated a shared MIMO air interface resource in response to the orthogonality measures. Step 305 is followed by step 307 wherein the shared MIMO air interface resource is allocated to the first set of user equipments for simultaneous MIMO communication.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

We claim:

1. A Multiple In Multiple Out, MIMO, communication system comprising:
    a vector processor for determining a receive equalizer vector for a MIMO receiver for each of a plurality of user equipments in response to a channel matrix for the user equipment;
    an orthogonality processor for determining, for a plurality of sets of user equipments, orthogonality measures between receive equalizer vectors of user equipments in the set, each set comprising at least two user equipments of the plurality of user equipments;
    a selection processor for selecting at least a first set of user equipments from the plurality of sets of user equipments to be allocated a shared MIMO air interface resource in response to the orthogonality measures; and
    an allocation processor for allocating the shared MIMO air interface resource to the first set of user equipments for simultaneous MIMO communication.

2. The MIMO communication system of claim 1 wherein the receive equalizer vector of a user equipment is indicative of weights applied to receive antennas of the MIMO receiver for the user equipment.

3. The MIMO communication system of claim 1 wherein the vector processor is arranged to perform a singular value decomposition of the channel matrix for each of a plurality of user equipments, the singular value decomposition providing a set of singular value decomposition values, a set of first single value decomposition vectors associated with transmitter antenna weights and a set of second single value decomposition vectors associated with receiver antenna weights; and to select the receive equalizer vector as a vector of the set of second single value decomposition vectors associated with receiver antenna weights.

4. The MIMO communication system of claim 3 wherein the vector processor is arranged to select the receive equalizer vector as a vector of the set of second single value decomposition vectors associated with receiver antenna weights corresponding to a singular value decomposition value of the set of singular value decomposition values having a highest value.

5. The MIMO communication system of claim 1 wherein each of the plurality of sets of user equipments contain two user equipments.

6. The MIMO communication system of claim 1 wherein the selection processor is arranged to select the first set of user equipments as the set of user equipments having a highest orthogonality measure.

7. The MIMO communication system of claim 1 wherein the orthogonality processor is arranged to determine an inner product between receive equalizer vectors of at least one pair of user equipments of at least one set of the plurality of sets of user equipments; and to determine the orthogonality measure for the at least one set in response to the inner product.

8. The MIMO communication system of claim 1 wherein the orthogonality processor is arranged to:
  determine an orthogonal vector of the receive equalizer vector of a first user equipment of at least one set of the plurality of sets of user equipments;
  determine a distance measure between the orthogonal vector and a receive equalizer vector of at least one other user equipment of the at least one set; and
  determining an orthogonality measure for the at least one set in response to the distance measure.

9. The MIMO communication system of claim 1 arranged to allocate shared MIMO air interface resource blocks to each of a plurality of selected sets of the plurality of sets of user equipments by iteratively selecting a selected set of user equipments and removing the selected set from the plurality of sets of user equipments.

10. The MIMO communication system of claim 1 wherein the selection processor is arranged to select a plurality of sets of user equipments for a plurality of shared MIMO air interface resource blocks by, for a plurality of combinations of sets of user equipments, determining a combined orthogonality measure in response to orthogonality measures of sets of user equipments included in the combination; and to select a first combination of the plurality of combinations in response to the combined orthogonality measures; and the allocation processor is arranged to allocate a shared MIMO air interface resource block to each set of the first combination.

11. The MIMO communication system of claim 1 wherein the shared MIMO air interface resource is an uplink resource.

12. The MIMO communication system of claim 1 wherein the MIMO receiver is a receiver of a MIMO base station of the MIMO communication system.

13. The MIMO communication system of claim 1 wherein the MIMO receiver comprises a linear equalizer for differentiating between transmissions in the shared MIMO air interface resource from user equipments of the first set.

14. A scheduler for a Multiple In Multiple Out, MIMO, communication system, the scheduler comprising:
  a vector processor for determining a receive equalizer vector for a MIMO receiver for each of a plurality of user equipments in response to a channel matrix for the user equipment;
  an orthogonality processor for determining, for a plurality of sets of user equipments, orthogonality measures between receive equalizer vectors of user equipments in the set, each set comprising at least two user equipments of the plurality of user equipments;
  a selection processor for selecting at least a first set of user equipments from the plurality of sets of user equipments to be allocated a shared MIMO air interface resource in response to the orthogonality measures; and
  an allocation processor for allocating the shared MIMO air interface resource to the first set of user equipments for simultaneous MIMO communication.

15. A method of operation for a Multiple In Multiple Out, MIMO, communication system, the method comprising:
  determining a receive equalizer vector for a MIMO receiver for each of a plurality of user equipments in response to a channel matrix for the user equipment;
  determining, for a plurality of sets of user equipments, orthogonality measures between receive equalizer vectors of user equipments in the set, each set comprising at least two user equipments of the plurality of user equipments;
  selecting at least a first set of user equipments from the plurality of sets of user equipments to be allocated a shared MIMO air interface resource in response to the orthogonality measures; and
  allocating the shared MIMO air interface resource to the first set of user equipments for simultaneous MIMO communication.

* * * * *